US012756735B2

(12) United States Patent
White et al.

(10) Patent No.: US 12,756,735 B2
(45) Date of Patent: Oct. 6, 2026

(54) CYBERSECURITY RISK CALCULATION AND REPORTING MODEL

(71) Applicant: Truist Bank, Charlotte, NC (US)

(72) Inventors: Brian Matthew White, Mint Hill, NC (US); Ian Lassonde, Cornelius, NC (US)

(73) Assignee: TRUIST BANK, Charlotte, NC (US)

( * ) Notice: Subject to any disclaimer, the term of this patent is extended or adjusted under 35 U.S.C. 154(b) by 38 days.

(21) Appl. No.: 18/776,396

(22) Filed: Jul. 18, 2024

(65) Prior Publication Data

US 2026/0025399 A1 Jan. 22, 2026

(51) Int. Cl.
*H04L 9/40* (2022.01)

(52) U.S. Cl.
CPC ................................ *H04L 63/1433* (2013.01)

(58) Field of Classification Search
CPC ................................................... H04L 63/1433
See application file for complete search history.

(56) References Cited

U.S. PATENT DOCUMENTS

| | | | | |
|---|---|---|---|---|
| 8,505,102 | B1 * | 8/2013 | Cannings | H04L 63/145 713/188 |
| 9,294,498 | B1 * | 3/2016 | Yampolskiy | H04W 84/12 |
| 10,635,985 | B2 | 4/2020 | Gauthier | |
| 11,431,740 | B2 * | 8/2022 | Heckman | H04L 63/20 |
| 11,477,219 | B2 * | 10/2022 | Jenkinson | H04L 63/0428 |
| 11,611,578 | B2 | 3/2023 | Kibler | |
| 12,003,529 | B1 | 6/2024 | Cohen | |
| 12,169,569 | B2 * | 12/2024 | Belfiore, Jr. | H04L 63/20 |
| 12,488,117 | B1 | 12/2025 | Beek | |
| 2015/0254985 | A1 | 9/2015 | Fisher | |
| 2016/0219067 | A1 * | 7/2016 | Han | H04L 63/1425 |
| 2017/0048267 | A1 | 2/2017 | Yampolskiy | |
| 2019/0289029 | A1 * | 9/2019 | Chawla | H04L 63/1425 |
| 2021/0211452 | A1 * | 7/2021 | Patel | H04L 63/1416 |

(Continued)

FOREIGN PATENT DOCUMENTS

| | | | | |
|---|---|---|---|---|
| CN | 120263442 A | * | 7/2025 | G06F 18/2323 |
| CN | 120321033 A | * | 7/2025 | G06N 3/08 |

(Continued)

*Primary Examiner* — Sarah Su
(74) *Attorney, Agent, or Firm* — Michael A. Springs, Esq.; Shumaker, Loop & Kendrick, LLP; Patrick B. Horne

(57) ABSTRACT

A cybersecurity risk reporting methodology for a bank's computer systems which includes a cybersecurity risk level calculation model. For each of the bank's organizational groups, the model is run on a periodic basis to calculate the cybersecurity risk level. Inputs to the calculation model include cybersecurity vulnerabilities and severities for each of the organizational group's applications and systems, along with a cybersecurity history rating for the group. The model calculates a cybersecurity risk level which is reported to the organizational group, along with an indication of whether the group's risk level exceeds a threshold which freezes the group's ability to implement feature-based application/system upgrades. Proposed security-related fixes may be provided as inputs to the model, which calculates a predicted cybersecurity risk level for the organizational group, allowing the group to identify what security fixes need to be implemented in order to lower the group's cybersecurity risk level below a threshold.

17 Claims, 4 Drawing Sheets

(56) References Cited

U.S. PATENT DOCUMENTS

| | | | | |
|---|---|---|---|---|
| 2022/0130274 | A1* | 4/2022 | Krishna Raju | H04L 63/1433 |
| 2022/0398323 | A1* | 12/2022 | Sloane | G06F 17/18 |
| 2023/0109224 | A1 | 4/2023 | Shaw | |
| 2023/0153443 | A1 | 5/2023 | Coppins | |
| 2023/0351026 | A1 | 11/2023 | Cross | |
| 2024/0112198 | A1 | 4/2024 | Kumar | |
| 2024/0202343 | A1 | 6/2024 | Darwatkar | |
| 2024/0232765 | A1* | 7/2024 | Austraat | G06F 40/30 |
| 2024/0348637 | A1* | 10/2024 | Bennett | H04L 63/1433 |
| 2024/0406192 | A1* | 12/2024 | Arnon | H04L 63/1416 |
| 2024/0414064 | A1 | 12/2024 | Ayachitula | |
| 2025/0173444 | A1 | 5/2025 | Koren | |
| 2025/0182121 | A1* | 6/2025 | Wali | G06Q 20/4016 |
| 2026/0019443 | A1* | 1/2026 | Kunal | G06F 21/577 |

FOREIGN PATENT DOCUMENTS

| | | | | |
|---|---|---|---|---|
| EP | 4057583 | A1 * | 9/2022 | H04W 12/30 |
| WO | WO-2014144402 | A1 * | 9/2014 | H04L 63/1416 |
| WO | WO-2019200317 | A1 * | 10/2019 | G06N 3/0675 |
| WO | WO-2019207251 | A1 * | 10/2019 | G05B 19/4184 |

* cited by examiner

CYBERSECURITY RISK CALCULATION AND REPORTING MODEL

FIELD

The present disclosure relates generally to the field of digital banking data systems, and more particularly to a workflow process, system architecture and computation model for enabling a financial institution to calculate a cybersecurity risk level associated with an organizational group, freeze computer system changes from groups having a high cybersecurity risk level, and fast-track computer system changes from groups having a low cybersecurity risk level.

BACKGROUND

Banks and other financial institutions typically have many computerized data systems, often including old and highly specialized internal systems which are used only by bank employees and securely manage critical data such as account deposit balances, customer and employee data, and so forth.

In addition, digital banking systems are well known and used by many banks and their customers. Two common types of digital banking systems are online web-based systems which interact with a user (e.g., client) via a web browser window on a computer, and mobile applications ("apps") which run on mobile devices such as smart phones and tablets. Both online web-based banking systems and mobile banking apps communicate with back-end servers which manage account data, validate and execute specific transactions, provide data for display, etc. Both web-based and mobile app-based systems also include security and authentication features, where user-provided information and/or biometric information is collected from the customer or employee and validated with data stored on the back-end servers.

In spite of the security and authentication features of digital banking systems, and in spite of the fact that the bank's internal data systems are located behind firewalls and therefore not supposed to be available to anyone other than bank employees, cybersecurity risks exist for all of these types of systems. These risks include ransomware attacks, customer data breaches, and others.

Although banks and other businesses would never purposely introduce new and greater cybersecurity risks through system changes, they may lack a structured technique for evaluating and communicating risks associated with applications/systems and pending changes thereto, and may also lack a rigorous technique for proactively advising organizational groups when their cybersecurity risk level rises above a prescribed threshold.

In light of the circumstances described above, there is a need for a cybersecurity risk reporting methodology for banking systems which includes a formalized cybersecurity risk level calculation model.

BRIEF SUMMARY

The present disclosure describes a cybersecurity risk reporting methodology for a bank's systems and applications which includes a formalized cybersecurity risk level calculation model. For each of a plurality of the bank's organizational groups, the model is run on a periodic basis to calculate the cybersecurity risk level for the group. Inputs to the risk level calculation model include cybersecurity vulnerabilities and severities for each of the organizational group's applications and systems, along with a cybersecurity history rating for the organizational group. The model calculates a cybersecurity risk level which is reported to the organizational group, along with an indication of whether the group's risk level exceeds a threshold which freezes the group's ability to implement feature-based upgrades of applications and systems. Proposed security-related fixes may be provided as additional inputs to the model, which calculates a predicted cybersecurity risk level for the organizational group, allowing the group to identify what security fixes need to be implemented in order to lower the group's cybersecurity risk level to a target value.

The features, functions, and advantages that have been discussed may be achieved independently in various embodiments of the present disclosure or may be combined in yet other embodiments, further details of which can be seen with reference to the following description and drawings, along with the appended claims.

DETAILED DESCRIPTION OF EMBODIMENTS

Figure 1:
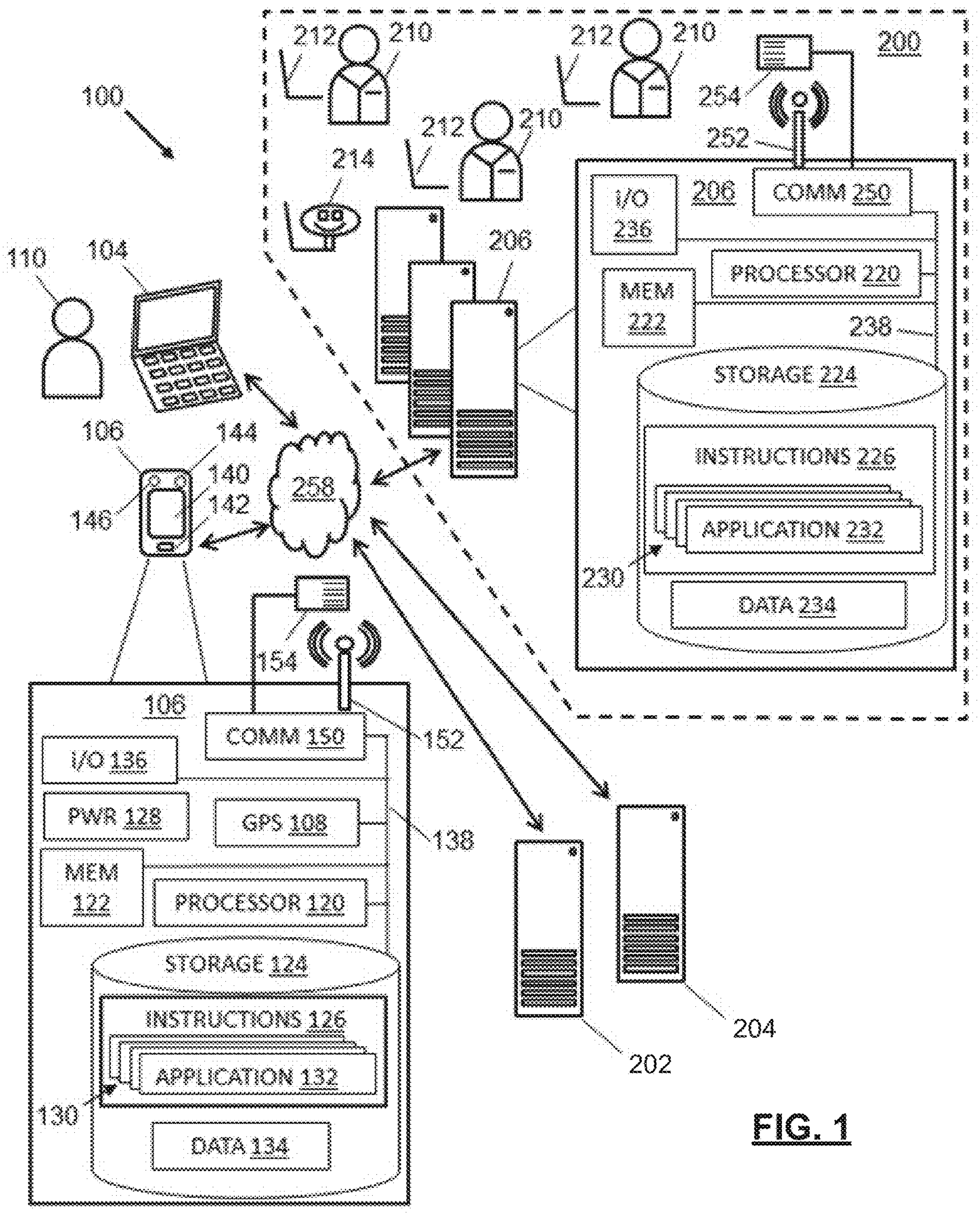
FIG. 1 illustrates an enterprise system, and environment thereof, including a centralized server system, distributed computers and mobile devices, and communication therebetween, according to at least one embodiment of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, including centralized and distributed computing devices, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wide-band (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

Figure 2:
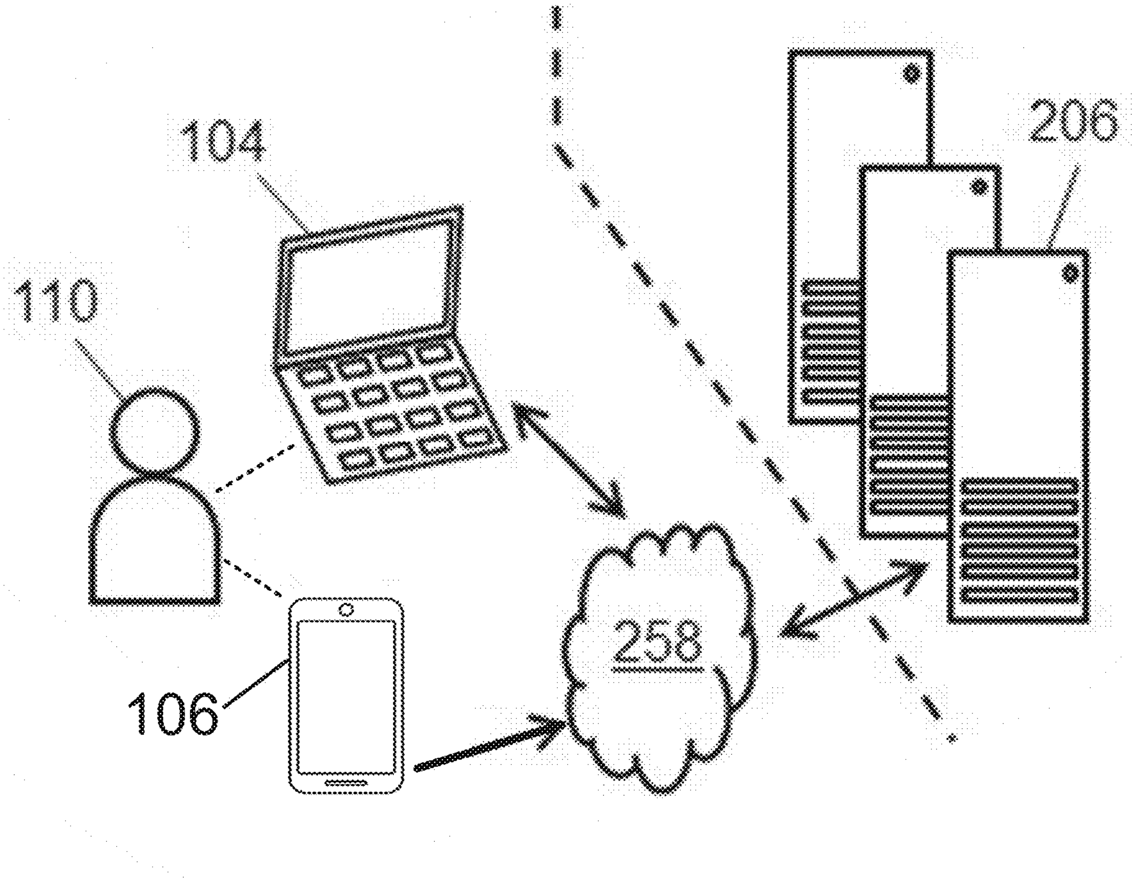
FIG. 2 is a simplified illustration of the enterprise system of FIG. 1, showing the elements most directly involved in online and digital banking systems used in the communication and implementation of an upgraded deposit interest rate as embodied in the techniques of the present disclosure.

FIG. 2 is a simplified illustration of the enterprise architecture depicted in FIG. 1, showing the elements most directly involved in using online/digital banking systems. The user 110 (e.g., a client) uses either the computing device 104 or the mobile device 106 to access a digital banking system, where the computing device 104 would run a web browser application in which the digital banking system is displayed, and the mobile device 106 would run a mobile application ("app") specifically designed as the digital banking system. The computing device 104 and/or the mobile device 106 communicate with the computing system (back-end servers) 206 via the network ("the cloud") 258.

Banking customers have at least one account, and often more than one account, with a bank business. These accounts may include savings accounts, checking accounts, investment accounts, credit cards, loans, mortgages, etc. Online/digital banking systems are now widely used because they enable clients to conveniently perform most banking functions electronically—including opening accounts, transferring money between accounts, paying bills, viewing transaction details, etc. The use of online/digital banking systems as related to the techniques of the present disclosure will be illustrated in later figures and described in the discussion accompanying those figures.

Having described an enterprise computing environment as might be used by a banking business, and general characteristics of systems including online and digital banking systems which may be employed in the enterprise computing environment, attention is now turned to the specific topic of the present disclosure—a workflow process, system architecture and computation model for enabling a financial institution to calculate a cybersecurity risk level associated with an organizational group in the institution and, when risk levels exceed a threshold, freeze any feature-based changes to applications and systems from the group until the group's risk level can be reduced to a lower level.

As has been discussed above, bank businesses operate many different types of computer systems and databases—including the online and digital banking systems discussed immediately above, along with systems used and bank branch offices, and highly specialized internal systems which are used only by bank employees and which manage vital information such as customer account data. The internal systems are of the type represented by the applications or programs 230 discussed earlier with reference to FIG. 1, and the online and digital banking systems are of the type accessed by the user 110 on the computing device 104 or the mobile device 106, in communication with the computing system 206.

In spite of the security and authentication features of digital banking systems, and in spite of the fact that the bank's internal data systems are located behind firewalls and therefore not supposed to be available to anyone other than bank employees, cybersecurity risks exist for all of these types of systems and applications. These risks include ransomware attacks, customer data breaches, and others. It is well known that many nefarious characters—from individual hackers looking for a technical challenge, to large cyberterrorism organizations—are constantly trying to gain illicit access to many businesses' computer systems, and banks are no exception.

In digital banking systems in particular, there is great pressure and motivation to develop and roll out new releases and upgrades including features which are attractive to clients. This pressure to release new versions is increased by the fact that there are limited windows of time available (e.g., one upgrade window weekly) during which system and application upgrades may be rolled out, leading to a backlog of upgrades for implementation. Thus, once an application upgrade is developed, the responsible business area manager is highly motivated to put the upgraded application into production usage where the bank's clients can utilize the new features. However, all of this motivation to roll out new releases having new features must be counterbalanced by the need to ensure cybersecurity of the systems and applications. Although banks and other businesses would never purposely introduce new and greater cybersecurity risks through system changes, they may lack a structured technique for evaluating and communicating risks associated with applications/systems and pending changes thereto, and may also lack a rigorous technique for proactively advising organizational groups when their cybersecurity risk level rises above a prescribed threshold.

The techniques of the present disclosure describe a system architecture developed to enable a financial institution to evaluate a current level of cybersecurity risk for business areas or organizational groups of the company, evaluate a level of cybersecurity risk for a proposed update of an application or system, and use these cybersecurity risk levels to determine whether system changes proposed by an organizational group may be implemented. If the group's cybersecurity risk levels exceed a threshold, then a freeze is placed on changes or updates brought forward by the organizational group until the group's cybersecurity risk level can be brought down to an acceptable level.

The disclosed cybersecurity reporting method keeps business area managers informed of their current cybersecurity risk level, offers suggestions for improving (reducing) their cybersecurity risk level, and rewards behavior consistent with lowering cybersecurity risk. In essence, both the "feature freeze" change management process and the cybersecurity reporting method cause IT system and application development and deployment activities to adhere to policy. This is done by a combination of computational techniques and method logic which are discussed below.

Underlying both the cybersecurity risk reporting method and the "feature freeze" change management process are a model of cybersecurity risk. The calculation risk model enables quantitative evaluation of cybersecurity risk-including current levels for organizational groups, predicted levels for an organizational group if security-enhancing changes are made, and changes associated with proposed application or system upgrades. The quantification of cybersecurity risk level allows a structured reporting process and change management method.

Figure 3:
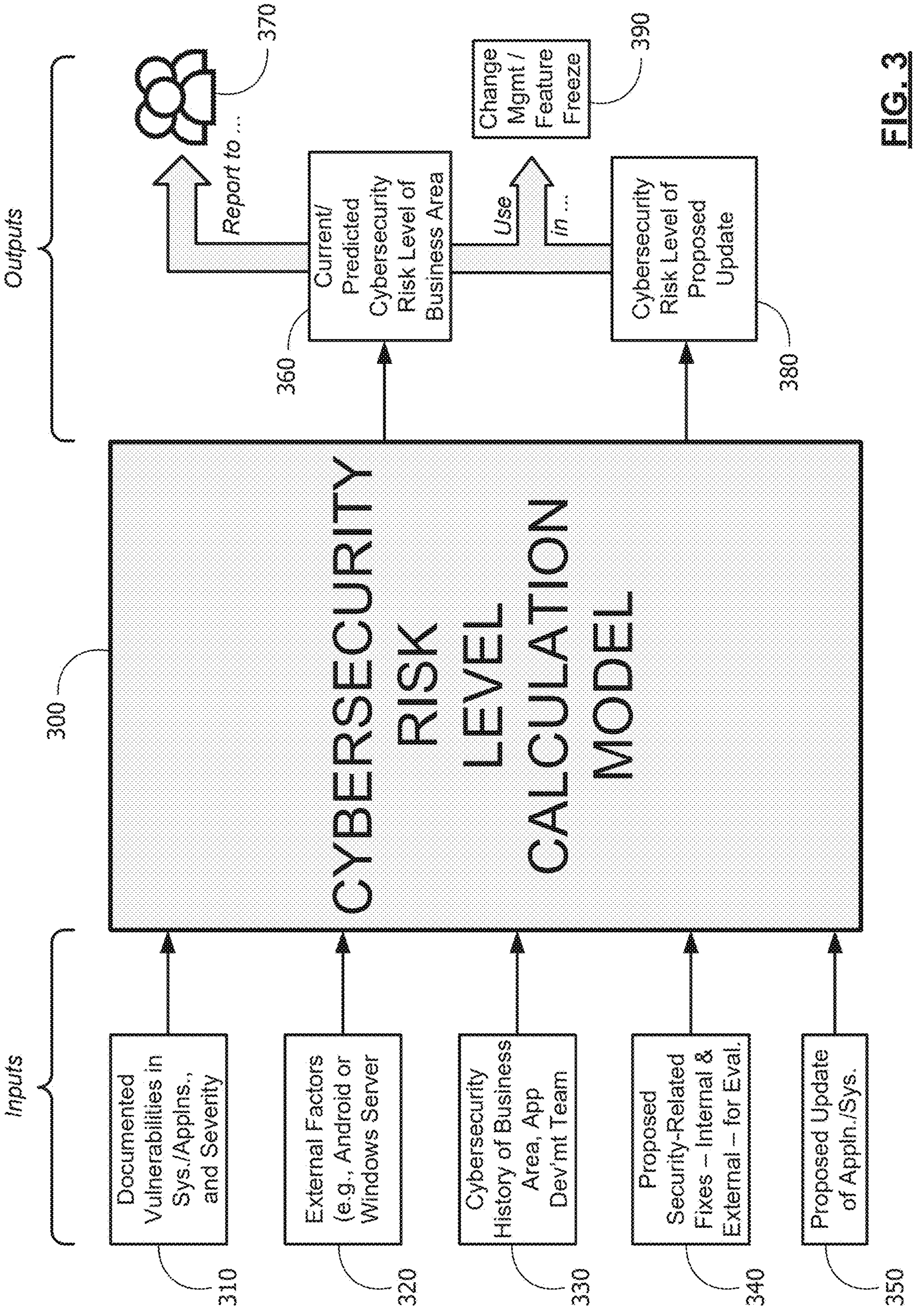
FIG. 3 is an illustration of a system architecture for a cybersecurity risk level calculation model, depicting inputs to the model which calculates current or predicted risk level of a business area of a company, and incremental risk level of a proposed system or application update, according to an embodiment of the present disclosure.

FIG. 3 is an illustration of a system architecture for a cybersecurity risk level calculation model 300, depicting inputs to the model 300 which calculates current or predicted risk level of a business area of a company, and risk level of a proposed system or application update, according to an embodiment of the present disclosure. On the left side of FIG. 3 are several inputs to the cybersecurity risk level calculation model 300. Each of these inputs is discussed below, along with how the inputs are used in the cybersecurity risk level calculation. The outputs of the model 300 are discussed later, along with how those outputs are used by the business.

A box 310 includes known and documented vulnerabilities in the bank's systems and applications, and the severity of each vulnerability. For the purposes of this discussion, "systems" generally refers to hardware such as servers and their operating system software, or to computer programs (often older) which run on their own dedicated hardware platform (such as mainframe computers). "Applications" generally refers to web-based applications and mobile applications which run in a web browser environment or on a mobile device operating system. However, these definitions are flexible, and all of the aforementioned types of hardware and software should be considered to be included in the scope of the cybersecurity risk level calculation model and the feature freeze change management method of the present disclosure.

A group (such as a cybersecurity security group) in the information technology (IT) department of the bank business is typically responsible for the list of vulnerabilities and their severities for the bank's applications & systems. The vulnerabilities may come from a variety of sources—including vulnerabilities which stem from utilities and program calls which the application invokes, shareware employed by the application, data sources accessed by the application, and possible vulnerabilities introduced by the programming technique of the application itself. Each of these vulnerabilities may be identified by the IT group by reviewing lists of vulnerabilities and cybersecurity incidents published by peers in the IT industry.

A box 320 includes external factors—such as vulnerabilities which are caused by an operating system or environment in which or on which an application or system runs. The risk level model must include these external factors, because they can affect so many applications and systems, and dramatically so. For example, if a company implements a new version of Windows Server for their web-based applications, and it is later determined that the new version includes a cybersecurity vulnerability which leaves applications running on that platform open to unauthorized access (i.e., a ransom attack, or a data breach), then this information is critical to cybersecurity risk level modeling and to prioritization of IT change management. Likewise, new releases of mobile operating systems may introduce new vulnerabilities, and major new mobile operating system releases are often followed by minor incremental updates which address cybersecurity vulnerabilities. This information is typically provided by the third party provider of the operating system or programming platform.

In box 330, the cybersecurity history of the business areas and application development teams in the company is provided. This history score provided at the box 330 indicates, for each department or team, whether the systems and applications owned or developed by them have a good cybersecurity track record or a bad one, and whether the business area is taking other steps (e.g., training) to prevent cybersecurity problems. For example, if the team responsible for development of the bank's mobile app used by clients has a very good track record (few documented cybersecurity vulnerabilities, and very few actual cybersecurity events), then that development team will have a good history score at the box 330. A good history score may be over 90 on a scale of 1-100 (higher is better), or a good score may be less than 10 on a scale of 1-100 (lower is better), depending on the formula used in calculating the cybersecurity risk level in the model 300. On the other hand, if a business area such as consumer lending tends to push out a lot of application and system updates which include cybersecurity vulnerabilities, then this business area will receive a poor history score (e.g., 50) at the box 330. The business areas as in the last example (consumer lending) are not application development groups—they are organizational groups (divisions or business units) of the bank business; but even though they don't develop application software, their behavior in pushing out new features and/or not addressing existing vulnerabilities must be accounted for in the cybersecurity risk level calculation model and in subsequent usage of the risk level score.

In box 340, an optional proposed security-related fix is provided for evaluation. For example, a new release of a mobile device operating system may be proposed in the box 340. This input allows a calculation of an updated cybersecurity risk level for a business area. That is, if the business area has a high cybersecurity risk level, but many of the cybersecurity risks would be addressed by the new mobile operating system release, the input from the box 340 allows the reduction in cybersecurity risk to be quantified. The result may be, "if we implement this new mobile operating system release, your department's cybersecurity risk level will go from 80 (yellow) to 40 (green)". The input from the box 340 may be a proposed security enhancement related to an external system such as an operating system, or a security enhancement related to an internal application or system. The input from the box 340 is only necessary when performing a "what if" calculation evaluating an impact on a business area's cybersecurity risk level score as discussed above.

In box 350, an optional proposed feature-based application or system upgrade is provided for evaluation. For example, a new release of a mobile application may have been developed with new features for linking to external financial accounts and services. This provision of a proposed new version of an application allows a calculation of an incremental cybersecurity risk level change for the application. That is, if the application has a low cybersecurity risk level, but many of the features contained in the proposed new version entail significant risk, the input from the box 350 allows incremental change in cybersecurity risk to be quantified. The result may that the applications cybersecurity risk level score goes from green to red (or equivalent numerical values), and this may require the new features to be divided up into multiple releases over a period of time to eliminate the large sudden security risk increase. The input from the box 350 is necessary whenever an application or system upgrade is being proposed for feature enhancement reasons, so that the feature freeze change management process may be employed using the risk level for a go/no-go determination. Application or system upgrades containing security enhancements may also be provided at the box 350 to determine how much of an improvement is made on the application or system's cybersecurity risk level score.

The inputs from the boxes 310-350 are provided to the cybersecurity risk level calculation model 300 to compute a cybersecurity risk level score for a business area or for an application or system. When the model 300 is used to compute a cybersecurity risk level for a business area (organizational group) of the bank company, the output is provided to a box 360. The cybersecurity risk level for the business area may be a current risk level based on inputs from the boxes 310-330, or the risk level for the business area may be a predicted risk level based on inputs from the boxes 310-340. When the model 300 is used to compute a cybersecurity risk level for an application or system, the output is provided to a box 380. The cybersecurity risk level for the application or system is a new risk level score based on inputs from the boxes 310-330 and the proposed update from the box 350.

The cybersecurity risk level calculations in the model 300 may be performed in any manner deemed suitable. In preferred embodiments, the calculations in the model 300 include all of the inputs from the boxes 310-350 which are applicable. A basic premise of the cybersecurity risk level calculations is that they take into account both the number of vulnerabilities and the severity factor of each.

In one non-limiting example, the current cybersecurity risk level for a business area (organizational group) of the bank company may be computed as follows:

$$CRL_{BA} = w_1\left(\sum_{i=1}^{n} vs_i\right) + w_2\left(\sum_{j=1}^{m} evs_j\right) + w_3(h_{BA}) \tag{1}$$

Where $CRL_{BA}$ is the current cybersecurity risk level of the business area. The first term inside the parentheses is the contribution from the box 310, wherein $w_1$ is a weight factor for this term, and the weight factor is multiplied by a summation of the vulnerability severities vs; for vulnerabilities numbered from i=1:n. The second term inside the parentheses is the contribution from the box 320, wherein $w_2$ is a weight factor for this term, and the weight factor is multiplied by a summation of the external vulnerability severities $evs_j$ for external vulnerabilities numbered from j=1:m. The last term is the contribution from the box 330 (the cybersecurity history of the business area), where $w_3$ is a weight factor for this term, and the weight factor is multiplied by the business area's history score $h_{BA}$. In the formulation of Equation (1), the history score $h_{BA}$ is defined so that a lower score is better. The first two terms in Equation (1)—the vulnerability severities—may be combined in some embodiments.

As discussed above, Equation (1) computes the current cybersecurity risk level for a business area of the bank. When it is desired to predict a new (improved) cybersecurity risk level for the business area or organizational group as a result of implementing security-related fixes, a fourth term can be added to Equation (1) which is a weight factor $w_4$ multiplied by a summation of the severities of all of the vulnerabilities which are fixed by the proposed security-related update. Either the weight factor $w_4$ or the severity values themselves are negative, so that effect of the fixed vulnerabilities is to reduce the cybersecurity risk level for the business area as a result of the proposed security-related update.

The calculation of a cybersecurity risk level for a business area includes all of the vulnerabilities, severities and fixes pertaining to all of the applications and systems belonging to that business area (which may be an application development team, or a business division of the bank, for example). In order to avoid unfairly penalizing an application development team or a business division which has a lot of applications and systems, the terms which are based on summations of vulnerability severities may be normalized by dividing by a number of applications or systems in some embodiments.

The output of Equation (1) from the cybersecurity risk level calculation model 300—whether for a current or predicted cybersecurity risk level of a business area—goes to the box 360. From the box 360, the cybersecurity risk level is reported to the business area team, shown at 370 in FIG. 3. The report to the business area team 370 may include both a current cybersecurity risk level and a predicted cybersecurity risk level which models the improved cybersecurity risk level which would result from addressing certain cybersecurity vulnerabilities.

The cybersecurity risk level for the business area from the box 360 is also provided to a change management process with feature freeze at box 390. The feature freeze change management process considers both the business area's cybersecurity risk level and the cybersecurity risk level of a proposed feature-based application or system upgrade in determining whether the proposed upgrade should be allowed to proceed to implementation. The feature freeze change management process is discussed briefly below in connection with the cybersecurity risk reporting method of FIG. 4.

As mentioned above, when the model 300 is used to compute a cybersecurity risk level for an application or system, the output is provided to the box 380. In one non-limiting example, the cybersecurity risk level for an application or system may be computed as follows:

$$CRL_{A/S} = w_1\left(\sum_{i=1}^{n} vs_i\right) + w_2\left(\sum_{j=1}^{m} evs_j\right) + w_3(h_{BA}) + w_4\left(\sum_{k=1}^{r} ivs_k\right) \tag{2}$$

Where $CRL_{A/S}$ is the cybersecurity risk level of the application or system, and the first three terms on the right-hand side of the equation are the same as described above for Equation (1). In this case, the vulnerabilities and severities (i and j) are those associated with the particular application or system, not all vulnerabilities for all applications/systems of a business area as in Equation (1). The third term (the cybersecurity history term) is calculated from the cybersecurity history of the business area or application development team (or both) responsible for the proposed update of the application or system. The fourth term is the contribution from the box 350, wherein $w_4$ is a weight factor for this term, and the weight factor is multiplied by a summation of the incremental vulnerability severities $ivs_k$ for vulnerabilities numbered from k=1:r. The incremental vulnerability severities $ivs_k$ are for new or incremental vulnerabilities which are believed to be contained in the application or system upgrade. This determination may be made by various persons in the bank's IT department—such as the application development team themselves, and a review or audit by an independent cybersecurity team at the bank. The vulnerabilities from the box 350, and those from the boxes 310 and 320, may be based on many facets of application/system design—including the types of data that the application or system accesses, the types of system services it uses, the use of third-party software modules and/or shareware, and the vulnerabilities and severities associated with each of these.

The cybersecurity risk level for the application or system, calculated by the model 300 using Equation (2), is provided from the box 380 to the change management process with feature freeze at the box 390. The feature freeze change management process considers both the business area's cybersecurity risk level and the cybersecurity risk level of a proposed feature-based application or system upgrade in determining whether the proposed upgrade should be allowed to proceed to implementation.

The weight factors $w_1$-$w_4$ used in Equations (1) and (2) above may be selected in any manner which provides suitable results to the business. This includes periodically performing a regression or optimization computation which, using historical data, determines the values of the weight factors which yield high cybersecurity risk level scores for application/system upgrades which turned out to have cybersecurity issues, and also yield low cybersecurity risk level scores for application/system upgrades which turned out to be problem-free. In some embodiments, all of the vulnerability severities (from the boxes 310, 320, 340 and 350) are summed together with a single weight factor, and the cybersecurity history of the business area or application development team has its own weight factor in a term separate from the vulnerability severities. Other such calculation combinations are possible.

In other embodiments, the vulnerability severities (in all of the summations contained in Equations (1) and (2)) may be computed using machine learning techniques. For example, clustering techniques may be used to detect clusters in cybersecurity incident reports, where the clusters designate where certain types of cybersecurity incidents align with particular vulnerabilities in the corresponding application or system. Then, the severity of the cybersecurity incidents and the prominence of the clusters may be used to calculate the vulnerability severities used in Equations (1) and (2). This calculation of the vulnerability severities may be performed periodically, with the results being used to continuously refine the cybersecurity risk level calculation model 300.

In another example, the historical data mentioned above may be used to create a machine learning model which is used in the cybersecurity risk level calculation model 300. In this embodiment, the machine learning model might be used instead of Equations (1) and (2) to determine the cybersecurity risk level score of the business area or the proposed application/system update. This could be done by using the application or system's actual cybersecurity incident history along with the inputs from the boxes 310-350 as labeled training data for supervised learning, and using the trained machine learning model to compute the cybersecurity risk level score for proposed upgrades having new inputs from the boxes 310-350. The supervised learning would be performed periodically to continuously transform the machine learning model to most accurately determine a cybersecurity risk level score based on actual vulnerability history.

The calculations of the model 300 may be performed on a regular periodic basis (e.g., weekly), and also on an ad-hoc on-demand basis (e.g., when a proposed updated is provided with a request to implement it in production, or when a business area wants to know the impact on its score if a set of security fixes are implemented). The calculations embodied in the cybersecurity risk level calculation model 300 provide the bank with an objective measurement of the cybersecurity risk level of individual applications and systems, and also of business areas and application development teams in the bank. The objective measurement in turn enables data-based and fact-based decisions on the production rollout of both feature-based upgrades and security-based upgrades of applications and systems. Such data-based decisions are a vast improvement from a group of people simply meeting and deciding "we're doing pretty well, it should be ok to proceed".

The calculations discussed above in connection with the cybersecurity risk level calculation model 300 are merely exemplary. One skilled in the art may envision other calculations which may be similarly used. Key capabilities of the cybersecurity risk level calculation model 300 are the ability to calculate a cybersecurity risk level (score) for both business areas of the bank and for proposed upgrades of applications or systems, where the cybersecurity risk level incorporates the number and severity of vulnerabilities (both internal and external) and also accounts for the cybersecurity history of the business area or application development team.

Figure 4:
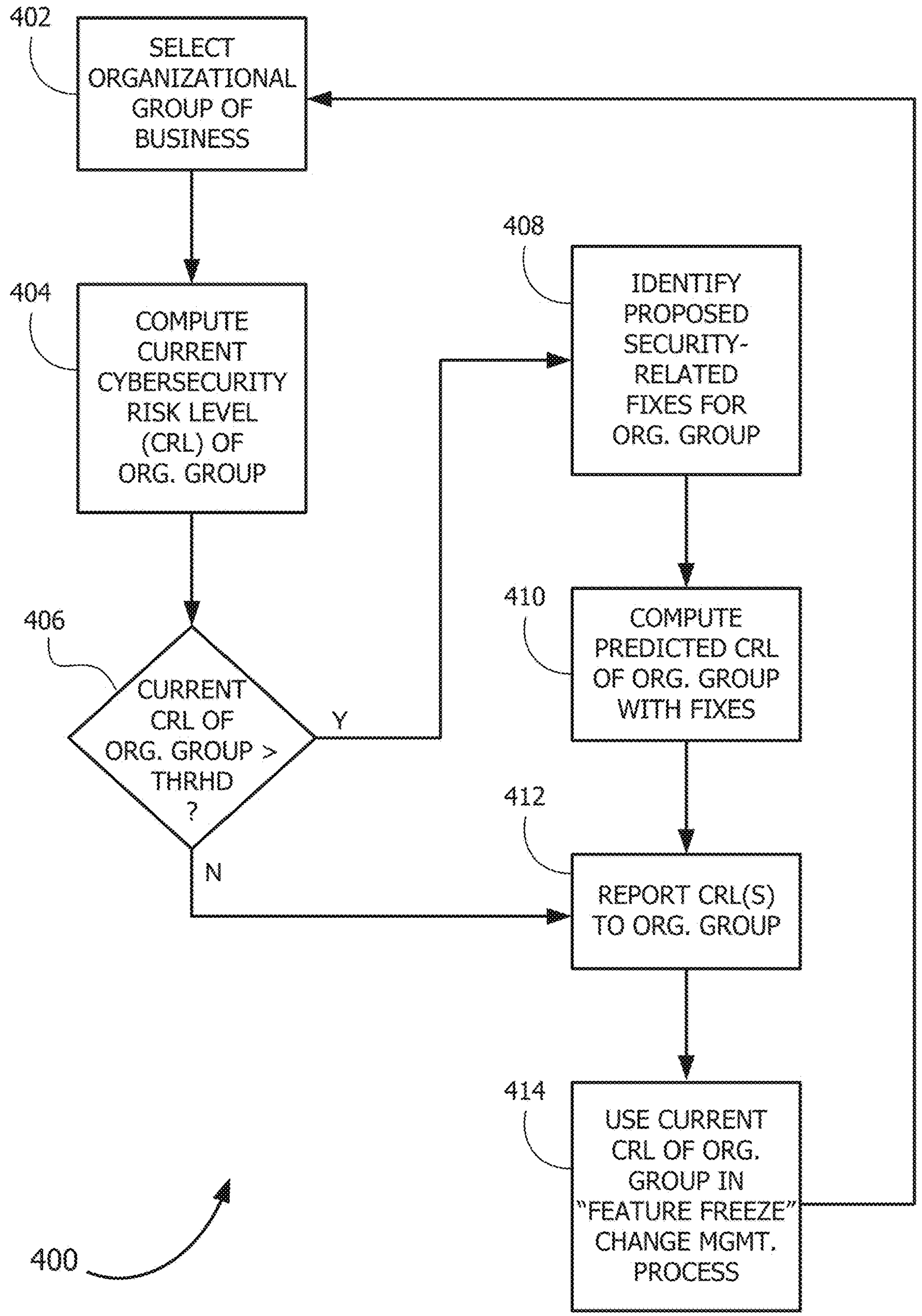
FIG. 4 is a flowchart diagram of a method for cybersecurity risk level reporting for organizational groups in a business, including calculating each group's current cybersecurity risk level and a predicted cybersecurity risk level if a proposed set of security fixes are implemented, according to an embodiment of the present disclosure.

FIG. 4 is a flowchart diagram 400 of a method for cybersecurity risk level reporting for organizational groups in a business, including calculating each group's current cybersecurity risk level and a predicted cybersecurity risk level if a proposed set of security fixes are implemented, according to an embodiment of the present disclosure. At box 402, an organizational group of the bank business is selected. As mentioned earlier, the organizational group could be a division or business unit of the bank, or the organizational group could be an application development team. If the organizational group is a division or business unit (or business team, or other equivalent terminology), then the cybersecurity risk level score which will be computed represents the computer applications and systems that the organizational group "owns" or is responsible for. If the organizational group is an application development team, then the cybersecurity risk level score represents the computer applications and systems that the team has directly developed.

At box 404, a current cybersecurity risk level (score) of the selected organizational group is computed. This computation is carried out as explained earlier in connection with FIG. 3. That is, the vulnerabilities and severities in the boxes 310 and 320, and the cybersecurity history of the organization group, are used to compute the group's cybersecurity risk level—which is output at the box 360. The reporting to the organizational group (the business area team 370)—which is the subject of the flowchart diagram 400 presently being discussed—was also shown on FIG. 3.

At decision diamond 406, it is determined whether the current cybersecurity risk level of the organizational group exceeds a predefined threshold. In a preferred embodiment, the threshold score has a value which means that the organizational group is outside the "green" or good status for cybersecurity risk level. In other words, the threshold may be set at the bottom of the "yellow" range of cybersecurity risk level—such as a value of 80 if the cybersecurity risk level scores are normalized to a range of 0-100.

If the current cybersecurity risk level of the organizational group exceeds the threshold at the decision diamond 406, this means that steps should be taken to improve the group's cybersecurity risk level score, and the process proceeds to a box 408. At the box 408, a set of proposed security-related fixes for the organizational group's cybersecurity risk level is identified. The proposed security-related fixes, provided at the box 340 of FIG. 3, may include fixes to documented vulnerabilities which were listed in the box 310, and/or upgrades to newer versions of external software (mobile operating systems, server software, etc.) to address vulnerabilities which were listed in the box 320. The proposed security-related fixes are intended to address vulnerabilities in any applications or systems "owned by" (in the case of business area groups) or developed by (in the case of application development teams) the organizational group. The proposed security-related fixes may be identified by a central IT group (such as a cybersecurity team), or by the organizational group themselves.

At box 410, a predicted cybersecurity risk level of the organizational group is calculated including the proposed security-related fixes from the box 408. This calculation of a predicted (and presumably improved) cybersecurity risk level for the organizational group, including the input from the box 340, was discussed earlier in connection with FIG. 3.

At box 412, the cybersecurity risk level(s) are reported to the organizational group. If the box 412 was reached directly from the decision diamond 408 (cybersecurity risk level score did not exceed threshold), then only the current cybersecurity risk level for the organizational group is reported, as no predicted cybersecurity risk level has been calculated. If the box 412 was reached from the box 410, then both the current cybersecurity risk level and the predicted cybersecurity risk level (with fixes) is reported to the organizational group. The predicted cybersecurity risk level enables the organizational group to understand what steps may need to be taken to get their cybersecurity risk level "back into the green".

A main objective of the cybersecurity risk level reporting is to get the entire company to understand that—if a group's cybersecurity risk level is above an acceptable range ("outside the green")—there will be consequences in terms of the group's ability to roll out new feature-based enhancements, and the group instead needs to place immediate focus on reducing its cybersecurity risk. This objective is enabled by the data-driven calculation of a cybersecurity risk level for a business area or an application development team, and by the reporting process depicted in FIG. 4.

At box 414, the current cybersecurity risk level of the organizational group is provided to an IT system change management process wherein a "feature freeze" is applied when cybersecurity risk level exceeds prescribed thresholds. The feature freeze change management process evaluates the cybersecurity risk level of both the application or system having the proposed change and the organizational group associated with the application or system. In the feature freeze change management process, various criteria may be defined for freezing a change, based on the cybersecurity risk level of the application/system, the cybersecurity risk level of the organizational group, and/or the combination of the two. It is by way of this feature freeze change management process that organizational groups feel the consequences of an elevated cybersecurity risk level. For example, if a group's cybersecurity risk level is in the yellow range, that may prevent a feature-based change from being approved, and if the group's cybersecurity risk level is in the red, that will definitely prevent a feature-based change from being approved.

After the current cybersecurity risk level of the organizational group is provided to the feature freeze change management process at the box 414, the process returns to the box 402 to select a new organizational group and compute the cybersecurity risk level score for the new group.

An organizational group may have its cybersecurity risk level re-computed at any time—such as on a periodic basis, or when any change is made which would affect the group's score. Such changes include making security-enhancing fixes and putting new feature-based enhancements into production. Company-wide changes such as upgrading a server software version will also normally change groups' cybersecurity risk level scores and may trigger running the cybersecurity risk level reporting process of FIG. 4 for most or all of a business's groups.

The cybersecurity risk level reporting process of FIG. 4 also serves to provide a positive incentive for organizational groups to monitor and improve their cybersecurity risk level. The positive incentive may be embodied in a "fast lane" change management process which fast tracks feature-based changes for groups with a very good cybersecurity risk level score. This fast lane status is also enabled by providing a group's cybersecurity risk level score to the change management process at the box 414 after reporting the score to the group.

Throughout the preceding discussion, various computers and programs are described and implied. It is to be understood that the software applications and modules of these computers are executed on one or more computing devices having a processor and a memory module. In particular, this includes computer(s) with processor(s) configured with algorithms performing the functions of the blocks in FIG. 3—that is, providing the vulnerability and severity data, cybersecurity history scores and proposed upgrades, computing the cybersecurity risk level score using the model 300, and using the cybersecurity risk level score for reporting to the business area team and also in the feature freeze change management process.

The cybersecurity reporting method of the present disclosure provides an objective data-based means for a bank to compute a cybersecurity risk level score for each organizational group and report the score and its implications to the group. In conjunction with a change management process which evaluates cybersecurity risk, the cybersecurity reporting drives the desired behavior in the company, ultimately resulting in reduced cybersecurity risk. The improved cybersecurity in turn increases client satisfaction and improves employee productivity, both of which are good for the financial institution.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A method for transmitting a cybersecurity risk level to an entity, said method comprising:

computing a current cybersecurity risk level of the entity using a risk level calculation model, where the model runs on a computing device and computes the current cybersecurity risk level based on inputs including a list of vulnerability severities for the entity and a cybersecurity history parameter for the entity, and the model computes the current cybersecurity risk level by multiplying a first weight factor by a sum of the vulnerability severities and adding a second weight factor multiplied by the cybersecurity history parameter; and when the current cybersecurity risk level of the entity does not exceed a threshold, transmitting the current cybersecurity risk level to the entity.

2. The method according to claim 1 further comprising, when the current cybersecurity risk level of the entity exceeds the threshold, identifying a set of proposed security-related fixes for the entity, computing a predicted cybersecurity risk level of the entity using the model with the set of proposed security-related fixes, the list of cybersecurity vulnerability severities and the cybersecurity history parameter, and reporting the current and predicted cybersecurity risk levels along with a restricted change implementation status to the entity.

3. The method according to claim 1 wherein the entity is an organizational group of a business, and the list of vulnerability severities includes cybersecurity vulnerabilities in all computer applications and systems associated with the organizational group.

4. The method according to claim 3 wherein the organizational group is either an application development group which developed the computer applications and systems or a department of a business which has a business need for the computer applications and systems.

5. The method according to claim 4 wherein the cybersecurity history parameter is determined based on a cybersecurity incident track record of the organizational group, a degree to which the organizational group has taken cybersecurity risk training, and a degree to which the organizational group uses designated information technology development tools to prevent new cybersecurity risks.

6. The method according to claim 3 further comprising using the current and predicted cybersecurity risk levels of the organizational group in a feature freeze change management process, wherein the current and predicted cybersecurity risk levels of the organizational group are considered in determining whether a feature-enhancing change to an application or system is approved for implementation.

7. The method according to claim 3 wherein the vulnerability severities and the weight factors are periodically updated by analyzing historical data, including comparing actual cybersecurity incident occurrences for previous updates of the applications and systems associated with the organizational group to a corresponding cybersecurity risk level, and adjusting the vulnerability severities and the weight factors so that a first group comprising the applications and systems which experienced cybersecurity incidents receive higher cybersecurity risk level scores than a second group comprising the computer systems which did not experience cybersecurity incidents, and so that a difference between the cybersecurity risk level scores of the first group and the second group is maximized.

8. The method according to claim 7 further comprising including a machine learning algorithm in the risk level calculation model and computing a second value of the cybersecurity risk level using the machine learning algorithm, wherein the vulnerability severities and the weight factors are periodically adjusted via a supervised learning process using the historical data as a labelled training dataset, and the adjusted vulnerability severities and weight factors are used by the risk level calculation model thenceforth to compute the current and predicted cybersecurity risk levels for any organizational group.

9. A method for reporting a cybersecurity risk level to an organizational group of a business, said method comprising:

computing a current cybersecurity risk level of the organizational group using a risk level calculation model which runs on a computing device and computes the current cybersecurity risk level based on inputs including a list of vulnerability severities for the organizational group and a cybersecurity history parameter for the organizational group, where the model computes the current cybersecurity risk level by multiplying a first weight factor by a sum of the vulnerability severities and adding a second weight factor multiplied by the cybersecurity history parameter;

when the current cybersecurity risk level of the organizational group does not exceed a threshold, transmitting the current cybersecurity risk level to the organizational group;

when the current cybersecurity risk level of the organizational group exceeds the threshold, identifying a set of proposed security-related fixes for the organizational group, computing a predicted cybersecurity risk level of the organizational group using the model with the set of proposed security-related fixes, the list of cybersecurity vulnerability severities and the cybersecurity history parameter, and reporting the current and predicted cybersecurity risk levels along with a restricted change implementation status to the organizational group; and using the current and predicted cybersecurity risk levels of the organizational group in a feature freeze change management process, wherein the current and predicted cybersecurity risk levels of the organizational group are considered in determining whether a feature-enhancing change to an application or system is approved for implementation.

10. The method according to claim 9 wherein the list of vulnerability severities includes cybersecurity vulnerabilities in all computer applications and systems associated with the organizational group, where the organizational group is either an application development group which developed the computer applications and systems or a department of a business which has a business need for the computer applications and systems, and the cybersecurity history parameter is determined based on a cybersecurity incident track record of the organizational group, a degree to which the organizational group has taken cybersecurity risk training, and a degree to which the organizational group uses designated information technology development tools to prevent new cybersecurity risks.

11. A cybersecurity reporting system, said system comprising:

a computer having a processor and memory, and non-transitory computer readable media configured to perform steps including;

computing a current cybersecurity risk level of an organizational group of a business using a risk level calculation model, where the model computes the current cybersecurity risk level based on inputs including a list of vulnerability severities for the organizational group and a cybersecurity history parameter for the organizational group, and the model computes the current cybersecurity risk level by multiplying a first weight factor by a sum of the vulnerability severities and adding a second weight factor multiplied by the cybersecurity history parameter; and when the current cybersecurity risk level of the organizational group does not exceed a threshold, transmitting the current cybersecurity risk level to the organizational group.

12. The system according to claim 11 wherein the cybersecurity history parameter is determined based on a cybersecurity incident track record of the organizational group, a degree to which the organizational group has taken cybersecurity risk training, and a degree to which the organizational group uses designated information technology development tools to prevent new cybersecurity risks.

13. The system according to claim 11 wherein the list of vulnerability severities includes cybersecurity vulnerabilities in all computer applications and systems associated with the organizational group, and the organizational group is either an application development group which developed the computer applications and systems or a department of a business which has a business need for the computer applications and systems.

14. The system according to claim 11 further comprising, when the current cybersecurity risk level of the organizational group exceeds the threshold, identifying a set of proposed security-related fixes for the organizational group, computing a predicted cybersecurity risk level of the organizational group using the model with the set of proposed security-related fixes, the list of cybersecurity vulnerability severities and the cybersecurity history parameter, and reporting the current and predicted cybersecurity risk levels along with a restricted change implementation status to the organizational group.

15. The system according to claim 14 further comprising using the current and predicted cybersecurity risk levels of the organizational group in a feature freeze change management process, wherein the current and predicted cybersecurity risk levels of the organizational group are considered in determining whether a feature-enhancing change to an application or system is approved for implementation.

16. The system according to claim 11 wherein the vulnerability severities and the weight factors are periodically updated by analyzing historical data, including comparing actual cybersecurity incident occurrences for previous updates of the applications and systems associated with the organizational group to a corresponding cybersecurity risk level, and adjusting the vulnerability severities and the weight factors so that a first group comprising the applications and systems which experienced cybersecurity incidents receive higher cybersecurity risk level scores than a second group comprising the computer systems which did not experience cybersecurity incidents, and so that a difference between the cybersecurity risk level scores of the first group and the second group is maximized.

17. The system according to claim 16 further comprising including a machine learning algorithm in the risk level calculation model and computing a second value of the cybersecurity risk level using the machine learning algorithm, wherein the vulnerability severities and the weight factors are periodically adjusted via a supervised learning process using the historical data as a labelled training dataset, and the adjusted vulnerability severities and weight factors are used by the risk level calculation model thenceforth to compute the current and predicted cybersecurity risk levels for any organizational group.

* * * * *